(12) United States Patent
Wiessner et al.

(10) Patent No.: US 8,636,869 B2
(45) Date of Patent: Jan. 28, 2014

(54) CURED IN PLACE PIPE LINER

(75) Inventors: Robert J. Wiessner, Bladel (NL); Donald A. Meltzer, Akron, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 63 days.

(21) Appl. No.: 13/252,233

(22) Filed: Oct. 4, 2011

(65) Prior Publication Data

US 2012/0018080 A1 Jan. 26, 2012

Related U.S. Application Data

(62) Division of application No. 12/015,552, filed on Jan. 17, 2008, now Pat. No. 8,047,238.

(60) Provisional application No. 60/885,524, filed on Jan. 18, 2007.

(51) Int. Cl.
*B32B 37/00* (2006.01)

(52) U.S. Cl.
USPC .............................. 156/287; 156/293; 156/294

(58) Field of Classification Search
USPC .......................................... 156/287, 293, 294
See application file for complete search history.

(56) References Cited

U.S. PATENT DOCUMENTS

| | | | |
|---|---|---|---|
| 4,009,063 A | 2/1977 | Wood | |
| 4,064,211 A | 12/1977 | Wood | |
| 4,446,181 A | 5/1984 | Wood | |
| 4,600,615 A | 7/1986 | Hyodo et al. | |
| 5,010,440 A * | 4/1991 | Endo | 264/36.17 |
| 5,159,053 A * | 10/1992 | Kolycheck et al. | 528/80 |
| 6,042,668 A | 3/2000 | Kamiyama et al. | |
| 6,062,271 A | 5/2000 | Reynolds et al. | |
| 6,170,531 B1 | 1/2001 | Jung et al. | |
| 6,354,330 B1 | 3/2002 | Wood | |
| 6,374,862 B1 | 4/2002 | Schwert | |
| 2003/0213596 A1 | 11/2003 | Davis | |
| 2004/0198944 A1* | 10/2004 | Meltzer et al. | 528/80 |
| 2004/0236035 A1 | 11/2004 | Lagneaux et al. | |
| 2005/0194718 A1 | 9/2005 | Blades et al. | |

FOREIGN PATENT DOCUMENTS

| | | |
|---|---|---|
| DE | 19718655 A1 | 11/1998 |
| EP | 0155406 A2 | 9/1985 |
| EP | 1092909 A1 | 4/2001 |
| GB | 1340068 A | 12/1973 |
| GB | 2080844 A | 2/1982 |
| WO | 93/06410 A1 | 4/1993 |
| WO | 94/04349 A1 | 3/1994 |
| WO | 00/25057 A1 | 5/2000 |

* cited by examiner

*Primary Examiner* — Jeff Aftergut
(74) *Attorney, Agent, or Firm* — Christopher D. Hilker

(57) ABSTRACT

A liner for repairing damaged pipes, such as underground sewer or gas pipes is disclosed. The liner comprises a TPU coating on a fibrous mat of non-woven fabric. The TPU coating is a high heat resistance polyester TPU which allows an epoxy resin/amine to be saturated in the non-woven fabric and the cure initiated by the use of steam or hot water. The cured epoxy resin converts the liner from a flexible state to a rigid state as the liner is cured in place inside the pipe. The TPU containing liner may also be used with thermoset resins other than epoxy resins, such as polyester resins and vinyl ester resins.

13 Claims, No Drawings

CURED IN PLACE PIPE LINER

RELATED U.S. APPLICATION DATA

This is a division of U.S. Pat. No. 8,047,238 issued on Nov. 1, 2011 which itself claims priority to U.S. provisional application No. 60/885,524 filed on Jan. 18, 2007.

FIELD OF THE INVENTION

The present invention relates to liners for pipes or various other passageways. More specifically, this invention relates to liners for underground sewers which are used to repair broken, pitted, or leaking main sewer pipes, lateral sewer pipes and gas pipes. The invention is directed to cured in place liners. That is, the liners are cured inside the pipe to be repaired. The invention is also directed to cured in place liners which use a thermoset resin saturated fabric where the thermoset resin is cured (hardened) by the use of heat.

BACKGROUND OF THE INVENTION

The cured in place method of lining damaged or broken pipes, such as sewers and gas pipes, has become a very successful method of repairing underground pipes. The method avoids the need to excavate the underground pipe and the resulting damage to surface infrastructure, such as paved streets and buildings. The cured in place method involves first positioning the liner inside the pipe while the liner is in a flexible state, then curing the liner to a hard state within the pipe while forcing the liner against the inside of the damaged pipe. Previous methods use air or water to pressurize the liner to have the flexible liner conform to the inside of the pipe and cure the liner to a hard state while it is held by the pressure to the inside of the pipe.

The prior art liners have been made by using a fabric on one side of the liner and a polymer sheet on the other side. The fabric is saturated with an uncured thermoset material. The curing, that is the process of converting the thermoset material to a rigid state, is performed after the liner has been placed inside the pipe. The liner can be placed in the pipe to be repaired by either the dragged-in method as described in U.S. Pat. No. 4,009,063 or the inversion method as described in U.S. Pat. No. 4,064,211, both of these patents are herein incorporated by reference. The polymer sheet placed on the fabric must be resistant to the thermosetting material used and also able to withstand the heat used to cure the thermoset material. Various thermoplastics and elastomers have been used to coat the fabrics, with polyurethane being frequently used.

Thermoplastic polyurethane is particularly desirable because of its abrasion resistance, tear resistance and elastic properties. However, recent installers of pipe liners expressed a desire to use an epoxy resin with an amine curative as the thermoset material in the liner and to use steam rather than hot water to initiate the cure and to press the liner against the inside of the pipe. The use of epoxy resins has some environmental benefits for the installer and steam is faster to evacuate from the inflated liner than is hot water.

The thermoplastic polyurethanes (TPU) used before in pipe liner are not acceptable when epoxy resin with an amine curative is used to saturate the non-woven fabric and steam is used to install the liner. The epoxy/amine reaction is exothermic and the heat from this reaction and the steam will cause prior art TPU to blow through the fabric containing the epoxy resin and form holes in the liner.

It can be beneficial to have a TPU which could be used in a cured in place liner where epoxy resin with an amine curative is used and where steam is used to install the liner. It would also be beneficial to have a TPU which could be used in a cured in place liner with either steam or hot water being used to cure the thermoset resin and where the thermoset resin can be epoxy, vinyl ester resin or polyester resin.

SUMMARY OF THE INVENTION

A liner for a passageway or pipeline is provided which has a layer of resin absorbent material, such as non-woven fabric, which is capable of accepting a thermoset resin, such as an epoxy resin. The liner also has a layer of thermoplastic polyurethane (TPU) attached to one surface of the layer of resin absorbent material. The TPU is a polyester TPU which is made by reacting a hydroxyl terminated polyester intermediate with a glycol chain extender and a diisocyanate. The TPU is a high heat TPU, that is, it has a high melting point, as represented by the Differential Scanning calorimetry (DSC) $2^{nd}$ heat melt endotherm peak temperature of greater than 140° C., preferably greater than 160° C. and more preferably greater than 170° C. The TPU also must have a Shore A hardness of from about 85 A to about 98 A.

The TPU used in this invention has sufficient heat resistance to be able to withstand the epoxy resin/amine curative exotherm as well as the steam temperature used in installation of the liner. The TPU can withstand the high temperature without forming holes in the liner which is referred to as "blow through" in the art. The TPU can also withstand the hot water if hot water were to be used in the installation of the liner.

DETAILED DESCRIPTION OF THE INVENTION

TPU

Thermoplastic polyurethane (TPU) polymers used in this invention are made by reaction of three reactants. The first reactant is a hydroxyl terminated polyester intermediate, the second reactant is a glycol chain extender, and the third reactant is a diisocyanate. Each of the three reactants is discussed below.

The hydroxyl terminated polyester intermediate is generally a linear polyester having a number average molecular weight (Mn) of from about 2000 to about 10,000, desirably from about 2000 to about 5000, and preferably from about 2000 to about 3000. The molecular weight is determined by assay of the terminal functional groups and is related to the number average molecular weight. The hydroxyl terminated polyester intermediate preferably has a low acid number, such as less than 1.5, preferably less than 1.0 and more preferably less than 0.8. A low acid number for the hydroxyl terminated polyester intermediate is preferred for liners which come in contact with moisture, because low acid numbers improve the hydrolytic stability of the TPU polymer. Acid number is determined according to ASTM D-4662 and is defined as the quantity of base, expressed in milligrams of potassium hydroxide that is required to titrate acidic constituents in 1.0 gram of sample. Hydrolytic stability can also be improved by adding hydrolytic stabilizers to the TPU which are known to those skilled in the art of formulating TPU polymers. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, diethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol. A blend of two or more glycols may be used. For a liner to be used to line a pipe where microbial resistance is required, such as gas pipes, diethylene glycol is the preferred glycol.

Suitable glycol chain extenders used as the second reactant to make the TPU can be aliphatic, aromatic or combinations thereof and have from 2 to about 12 carbon atoms. Preferably, the glycol chain extenders are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone, di(hydroxyethyl) ether, neopentyglycol, and the like, with 1,4-butanediol being preferred. Aromatic glycols can be used as the chain extender to make the TPU including benzene glycol and xylene glycol. Xylene glycol is a mixture of 1,4-di(hydroxymethyl)benzene and 1,2-di(hydroxymethyl)benzene. Benzene glycol specifically includes hydroquinone, i.e., bis(beta-hydroxyethyl) ether also known as 1,4-di(2-hydroxyethoxy)benzene; resorcinol, i.e., bis(beta-hydroxyethyl) ether also known as 1,3-di(2-hydroxyethyl)benzene; catechol, i.e., bis(beta-hydroxyethyl) ether also known as 1,2-di(2-hydroxyethoxy)benzene; and combinations thereof. A mixture of two or more glycols may be used as the chain extender in the TPU of this invention. A mixture of 1,4-butanediol and 1,6-hexanediol is the preferred mixture.

The third reactant to make the TPU of this invention is a diisocyanate. Suitable diisocyanates include aromatic diisocyanates such as: 4,4'-methylenebis-(phenyl isocyanate) (MDI); m-xylylene diisocyanate (XDI), phenylene-1,4-diisocyanate, 1,5-naphthalene diisocyanate, diphenylmethane-3,3'-dimethoxy-4,4'-diisocyanate (TODI) and toluene diisocyanate (TDI); as well as aliphatic diisocyanates such as isophorone diisocyanate (IPDI), 1,4-cyclohexyl diisocyanate (CHDI), decane-1,10-diisocyanate, hexamethylene diisocyanate (HDI), and dicyclohexylmethane-4,4'-diisocyanate. The most preferred diisocyanate is 4,4'-methylenebis(phenyl isocyanate), i.e., MDI. A mixture of two or more diisocyanates can be used. Also, small amounts of isocyanates having a functionality greater than 2, such as triisocyanates can be used together with the diisocyanates. Large amounts of isocyanates with a functionality of 3 or more should be avoided as they will case the TPU polymer to be crosslinked.

The three reactants (hydroxyl terminated polyester intermediate, glycol chain extender, and diisocyanate) are reacted together to form the high molecular weight TPU used in the linear of this invention. Any known processes to react the three reactants may be used to make the TPU. The preferred process is a so-called one-shot process where all three reactants are added to an extruder reactor and reacted. The equivalent weight amount of the diisocyanate to the total equivalent weight amount of the hydroxyl containing components, that is, the hydroxyl terminated polyester intermediate and the chain extender glycol, is from about 0.95 to about 1.10, desirably from about 0.96 to about 1.02, and preferably from about 0.97 to about 1.005. Reaction temperatures utilizing urethane catalyst are generally from about 175° C. to about 245° C. and preferably from 180° C. to 220° C.

Generally, any conventional catalyst can be utilized to react the diisocyanate with the polyester intermediates or the chain extender and the same is well known to the art and to the literature. Examples of suitable catalysts include the various alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming reactants.

The thermoplastic polyurethane can also be prepared utilizing a pre-polymer process. In the pre-polymer route, the hydroxyl terminated polyester intermediates are reacted with generally an equivalent excess of one or more diisocyanates to form a pre-polymer solution having free or unreacted diisocyanate therein. Reaction is generally carried out at temperatures of from about 80° C. to about 220° C. and preferably from about 150° C. to about 200° C. in the presence of a suitable urethane catalyst. Subsequently, a selective type of chain extender as noted above is added in an equivalent amount generally equal to the isocyanate end groups as well as to any free or unreacted diisocyanate compounds. The overall equivalent ratio of the total diisocyanate to the total equivalent of the hydroxyl terminated polyesters and the chain extender is thus from about 0.95 to about 1.10, desirably from about 0.96 to about 1.02 and preferably from about 0.97 to about 1.05. The equivalent ratio of the hydroxyl terminated polyesters to the chain extender is adjusted to give the desired shore hardness. The chain extension reaction temperature is generally from about 180° C. to about 250° C. with from about 200° C. to about 240° C. being preferred. Typically, the pre-polymer route can be carried out in any conventional device with an extruder being preferred. Thus, the polyester intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, with extruders equipped with barrier screws having a length to diameter ratio of at least 20 and preferably at least 25.

Useful additives can be utilized in suitable amounts and include opacifying pigments, colorants, mineral fillers, stabilizers, lubricants, UV absorbers, processing aids, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol)benzotriazoles and 2-hydroxybenzophenones. Additives can also be used to improve the hydrolytic stability of the TPU polymer.

The weight average molecular weight ($M_w$) of the TPU polymer is generally about 60,000 to about 500,000 and preferably from about 80,000 to about 300,000 Daltons. The TPU polymer also must have high temperature performance properties as exhibited by a DSC $2^{nd}$ heat melt endotherm peak temperature of greater than about 140° C., preferably greater than about 160° C., and more preferably greater than about 170° C. This high temperature performance is necessary to prevent holes from forming in the liner during the cured in place installation. The temperature performance properties are measured using a Different Scanning calorimetry (DSC) using scan conditions from −100° C. to 230° C. in heat/cool/heat mode at 10° C./min. ASTM D-3418-03 standard describes the DSC test. The $2^{nd}$ heat melt endotherm peak temperature is used to correct for any variances in the sample.

The most preferred TPU polymers will have a Shore A hardness of from about 85 A to about 98 A, preferably from 85 A to 90 A, and will have a Melt Flow Index of equal to or less than 40 g/10 min. @210° C. and 3.8 Kg load, preferably less than 35 g/10 min. and more preferably less than 30 g/10 min. Commercial TPU polymers that meet these requirements are known as Estane° 58437, 58447, 54605, 54777, T5630, T5620, 58605 and X-1351 and are commercially available from Lubrizol Advanced Materials, Inc. TPU polymers having a hardness higher than 98 Shore A will be too stiff to facilitate the insertion of the liner into the damaged pipe, particularly by the inversion method.

When the TPU is to be used for lining gas pipes, it is preferred to use a TPU which is made from a low acid number polyester intermediate and where the polyester intermediate is made by reacting adipic acid with diethylene glycol, as this type of TPU is believed to be more microbial resistant. Resistance to microbes is desirable for gas pipes.

The TPU should also have good resistance to solvents. Solvents can be used to solvent-weld TPU patches over the holes drilled into the liner, which are made to facilitate getting the thermoset resin into the resin absorbent layer. Solvents also can be used to solvent-weld a TPU tape over the lengthwise seams of the liner to make a closed tube from the original flat rectangular sheet.

The TPU should also have good resistance to and provide barrier properties to styrene as styrene is present in some of the thermosetting resins, such as styrene-based polyester resins. The TPU coating layer on the liner can prevent or reduce the migration of styrene into the fluid (water or steam) that is used to cure the thermoset resin. If too much styrene is present in the water, the water must be disposed of by more costly means rather than discharged to a municipal drainage system.

Resin Absorbent Material

A resin absorbent material is used as one layer of the liner. The resin absorbent material is any material which absorbs the thermoset resin. The resin absorbent layer can be from 0.1 to 20 cm thick, preferably from 0.2 to 15 cm thick and more preferably from 0.3 to 10 cm thick. Suitable resin absorbent materials include fibrous materials of organic or inorganic fibers which may be woven or non-woven fibers. Preferably, the resin absorbent material is a needle punched non-woven material, such as polyester non-woven mat when lining sewers (main or lateral). For lining gas pipes, a glass fiber material is typically preferred.

The TPU polymer is coated onto one side of the resin absorbent material. Melt processing equipment is used to coat the TPU onto the resin absorbent material. Suitable melt processing equipment includes calender and extrusion processes. The preferred thickness of the TPU coating layer on the liner is from about 100 to about 1000 microns, preferably from about 200 to about 800 microns, and more preferably from about 300 to about 500 microns thick. The TPU coating layer bonds very well to the polyester non-woven mat, thus the polyester non-woven mat is preferred with the TPU of this invention.

Liner

To make the liner of this invention, the TPU is melt coated or extrusion coated onto the resin absorbent material. A resin capable of being made into a thermoset resin, such as vinyl ester resin, polyester resin, or epoxy resin is added to the resin absorbent material. If any epoxy resin is used, an amine curing agent is added to the epoxy resin to cure the epoxy resin into a thermoset material. At this stage (before curing), the liner is flexible and can be placed inside the passageway of a cavity, such as a sewer pipe. The flexible liner can be inserted by either the drag-in or inversion method, which is well known in the art. Once inside the cavity, heat is added by injecting steam and/or hot water to force the liner against the inside of the pipe and to cure in place the thermoset resin. The liner can also be inserted into the cavity by use of hot water under pressure. Once the resin is cured, it becomes thermoset and the liner becomes rigid to form a rigid pipe within a pipe.

The liner can be made to the desired length required to repair the pipe, and preferably is a continuous tubular liner. The liner should have a length sufficient to repair the pipe with one continuous length that is not required to be spliced together from shorter pieces. The liner will typically be at least 50 meters in length and can be as long as 5000 meters in length. More typical the liners are lengths of from 200 to 1000 meters in length.

The diameter of the liner, once formed into a closed tube will vary depending on the diameter of pipe needing repair. Typical diameters are from about 5 cm to about 250 cm, but more commonly the diameters are 20 cm to about 150 cm.

The liner can conform to the shape of the inside of the pipe needing repair. The shape of the pipe does not need to be perfectly circular, but rather can be non-circular such as egg-shaped or elliptical shaped. The liner can also negotiate bends in the pipe.

After the resin absorbent fabric is impregnated with the thermosetting resin and the liner is made, it is typically stored at a cold temperature, either in an ice bath or a refrigerated truck. This cold storage is necessary to prevent premature curing of the thermoset resin, before it is installed. The liner can be brought to the job site in the refrigerated truck to prevent premature curing of the resin. In some instances, such as with epoxy resin, the resin absorbent layer can be impregnated with the resin at the job site.

After the liner is inserted into the damaged pipe, the resin is cured by exposing the liner to an elevated temperature of usually about 80° C. to 100° C. for 3 to 12 hours. Steam curing requires less time, usually 3-5 hours as compared to hot water which usually takes 8-12 hours. Thus, there is a tremendous time savings provided by using a TPU which can withstand the steam curing process.

The invention will be better understood by reference to the following example.

EXAMPLE 1

A needle punched non-woven polyester fiber mat, that was about 0.6 cm thick, was coated on one side with a polyester TPU. The thickness of the TPU coating was 450 microns. The polyester TPU was made by reacting a 2500 $M_n$ hydroxyl terminated polyester intermediate, 1,4-butanediol (BDO) chain extender and 4,4'-methylenebis(phenyl isocyanate) (MDI). The 2500 $M_n$ hydroxyl terminated polyester intermediate was made by reacting adipic acid with a blend of 1,4-butanediol and 1,6-hexanediol. The TPU polymer had a Shore A hardness of about 87 A and had a DSC $2^{nd}$ heat melt endotherm peak temperature of 180° C. and a Melt Flow Index of 25 g/10 min. @210° C./3.8 Kg. Epoxy resin was added to the non-woven fiber layer and an amine curing agent was added. The liner was inserted into a sewer pipe using the inversion method. Steam at 85° C. was added to activate the cure of the epoxy resin and to form a rigid liner inside the pipe. The cure time was 5 hours.

While in accordance with the Patent Statutes, the best mode and preferred embodiment has been set forth, the scope of the invention is not limited thereto, but rather by the scope of the attached claims.

What is claimed is:

1. A method for lining a cavity of a passageway or pipe comprising introducing a liner into said cavity; said liner comprising:
   (a) a resin absorbent material layer;
   (b) a thermoset resin absorbed into said resin absorbent material layer;
   (c) a polyester thermoplastic polyurethane coating layer on at least one side of said resin absorbent material layer; wherein said polyester thermoplastic polyurethane coating layer is made from the reaction consisting essentially of (i) a hydroxyl terminated polyester intermediate, (ii) a glycol chain extender, and (iii) a diisocyanate;
   wherein said thermoplastic polyurethane coating layer has a DSC $2^{nd}$ heat melt endotherm peak temperature of greater than about 160° C. and a melt flow index of less than 35 g/10 minutes at 210° C./3.8 Kg load;
   introducing steam or water into the inner opening of said liner to force the said liner against the inner surface of said passageway or said pipe and to activate the cure of said thermoset resin.

2. The method of claim 1, wherein said polyester thermoplastic polyurethane coating layer has a Shore A hardness of from about 85 A to about 98 A.

3. The method of claim 1, wherein said resin absorbent material layer is a needle punched non-woven polyester fabric.

4. The method of claim 1, wherein said polyester thermoplastic polyurethane coating layer has a thickness of from about 100 to about 1000 microns.

5. The method of claim 4, wherein said polyester thermoplastic polyurethane coating layer has a thickness of from about 300 to about 500 microns.

6. The method of claim 1, wherein said thermoset resin is selected from the group consisting of epoxy resin, vinyl ester resin, and polyester resin.

7. The method of claim 6, wherein said thermoset resin is epoxy resin and an amine curative for said epoxy resin is mixed with said epoxy resin; and wherein steam is used to force the said liner against the inner surface of said passageway or said pipe and to activate the cure of said epoxy resin.

8. The method of claim 1, wherein said pipe is selected from the group consisting of main sewer pipe, lateral sewer pipe, and gas pipe.

9. The method of claim 1, wherein said hydroxyl terminated polyester intermediate has a number average molecular weight of from 2000 to about 3000 Daltons.

10. The method of claim 9, wherein said hydroxyl terminated polyester intermediate is made from the reaction of adipic acid with diethylene glycol.

11. The method of claim 10, wherein said hydroxyl terminated polyester intermediate has an acid number of less than about 1.5, as measured according to ASTM D-4662.

12. The method of claim 1, wherein said glycol chain extender is a blend of 1,4-butanediol and 1,6-hexanediol, and wherein said diisocyanate is 4,4'-methylenebis-(phenyl isocyanate).

13. The method of claim 1, wherein said polyester thermoplastic polyurethane coating layer has a weight average molecular weight of from 60,000 to 500,000 Daltons, a DSC $2^{nd}$ heat endotherm peak temperature of greater than 170° C., and a melt flow index of less than 30 g/10 min. at 210° C./3.8 Kg.

* * * * *